US009935728B2

(12) United States Patent
Boduch et al.

(10) Patent No.: US 9,935,728 B2
(45) Date of Patent: Apr. 3, 2018

(54) METHOD AND APPARATUS FOR OPTICAL TRANSMITTER AND RECEIVER REDUNDANCY WITHIN A DIRECTIONLESS OPTICAL NODE

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

(*) Notice: Subject to any disclaimer, the term of this patent is extended or adjusted under 35 U.S.C. 154(b) by 0 days.

(21) Appl. No.: 15/200,755

(22) Filed: Jul. 1, 2016

(65) Prior Publication Data

US 2016/0315731 A1    Oct. 27, 2016

Related U.S. Application Data

(63) Continuation of application No. 14/486,348, filed on Sep. 15, 2014, now Pat. No. 9,413,488.

(60) Provisional application No. 61/880,861, filed on Sep. 21, 2013.

(51) Int. Cl.
*H04J 14/02* (2006.01)
*H04Q 11/00* (2006.01)

(52) U.S. Cl.
CPC ...... *H04J 14/0297* (2013.01); *H04J 14/0204* (2013.01); *H04J 14/029* (2013.01); *H04J 14/0212* (2013.01); *H04J 14/0217* (2013.01); *H04J 14/0283* (2013.01); *H04Q 11/0005* (2013.01)

(58) Field of Classification Search
CPC .......... H04J 14/0287–14/0297; H04B 10/032
See application file for complete search history.

(56) References Cited

U.S. PATENT DOCUMENTS

| | | | |
|---|---|---|---|
| 6,172,782 B1 * | 1/2001 | Kobayashi | H04J 14/02 370/219 |
| 8,165,468 B2 | 4/2012 | Boduch et al. | |
| 9,008,514 B2 | 4/2015 | Boduch et al. | |
| 9,276,695 B2 | 3/2016 | Boduch et al. | |
| 9,374,186 B1 | 6/2016 | Boduch et al. | |
| 2006/0133804 A1 | 6/2006 | Boduch et al. | |
| 2007/0286605 A1 * | 12/2007 | Feuer | H04J 14/0204 398/83 |
| 2010/0142961 A1 * | 6/2010 | Wisseman | H04J 14/0212 398/83 |
| 2010/0183294 A1 * | 7/2010 | Villarruel | H04B 10/032 398/10 |
| 2013/0039643 A1 * | 2/2013 | Tokura | H04B 10/032 398/7 |

* cited by examiner

*Primary Examiner* — David Payne
*Assistant Examiner* — Casey Kretzer

(57) ABSTRACT

Example embodiments of the present invention relate to an optical node comprising of at least two degrees, a plurality of directionless add/drop ports, a plurality of primary WDM transmitters and receivers, and at least one protection WDM transmitter and receiver, wherein the at least one protection WDM transmitter and receiver can transmit and receive in place of any of the plurality of primary WDM transmitters and receivers.

15 Claims, 7 Drawing Sheets

METHOD AND APPARATUS FOR OPTICAL TRANSMITTER AND RECEIVER REDUNDANCY WITHIN A DIRECTIONLESS OPTICAL NODE

RELATED APPLICATION

This application is a continuation of U.S. application Ser. No. 14/486,348, filed Sep. 15, 2014, which claims the benefit of: U.S. Provisional Application No. 61/880,861, filed on Sep. 21, 2013.

The entire teachings of the above application are incorporated herein by reference.

The specification of the present invention is substantially the same as that of the parent application. The "Related Application" paragraph has been revised to include a specific reference to the parent application. The specification of the present invention contains no new subject matter.

BACKGROUND

The present invention relates generally to optical communication systems and, more particularly, to methods and apparatus for optical transmitter and receiver redundancy within a directionless optical node.

SUMMARY

A method and corresponding apparatus in an example embodiment of the present invention relates to providing a means of providing Wavelength Division Multiplexed (WDM) transmitter and receiver redundancy within a WDM optical node containing directionless add drop ports.

The method comprises: providing a plurality of add/drop ports that allow a plurality of primary WDM transmitters and receivers be directed to more than one degree, providing a protection WDM transmitter and receiver, and providing a method of substituting the protection WDM transmitter and receiver for any of the primary WDM transmitters and receivers.

An optical node is presented. The optical node comprises, at least two WDM degrees, a plurality of directionless add/drop ports, a plurality of primary WDM transmitters and receivers, and at least one protection WDM transmitter and receiver, wherein the at least one protection WDM transmitter and receiver can transmit and receive in place of any of the plurality of primary WDM transmitters and receivers. The directionless add/drop ports may be colored add/drop ports. The at least one protection WDM transmitter and receiver may be added and dropped using a colorless add/drop port. There may be n number of primary WDM transmitters and receivers, and there may be m number of protection WDM transmitters and receivers, wherein any of m number of protection WDM transmitters and receivers can transmit and receive in place of any of the n number of primary WDM transmitters and receivers.

Within the optical node, electronic circuitry may be used to substitute the at least one protection WDM transmitter and receiver with the any of the plurality of primary WDM transmitters and receivers. The electronic circuitry may comprise a plurality of electronic multiplexers and de-multiplexers. The electronic circuitry may comprise a plurality of electronic multiplexers and de-multiplexers and an electronic switch.

The at least one protection WDM transmitter may use a tunable laser.

The optical node may further comprise at least one ROADM circuit pack. The at least one protection WDM transmitter and receiver may reside on the at least one ROADM circuit pack.

The optical node may further comprise at least one controller circuit pack. The at least one protection WDM transmitter and receiver may reside on the at least one controller circuit pack.

The optical node may further comprise a plurality of cards slots that are able to house transponder circuit packs. Additionally, the optical node may further comprise a protection circuit pack, wherein the protection circuit pack comprises the at least one protection WDM transmitter and receiver. The protection circuit pack may be placed in the plurality of cards slots that are able to house transponder circuit packs.

The optical node may further comprise at least one WDM multiplexer/de-multiplexer circuit pack. The at least one protection WDM transmitter and receiver may reside on the at least one WDM multiplexer/de-multiplexer circuit pack.

The optical node may further comprise at least a first equipment shelf and a second equipment shelf. The at least one protection WDM transmitter and receiver may reside in the first equipment shelf, and at least one of the primary WDM transmitters and receivers being protected may reside in the second equipment shelf.

The optical node may further comprise at least one transponder circuit pack containing at least one WDM transmitter and receiver, and at least one service interface, wherein the at least one service interface transports service data.

In the optical node, the service data may be forwarded to the at least one WDM transmitter in order to be transmitted by the WDM transmitter.

In the optical node, the service data may be forwarded to the protection WDM transmitter in order to be transmitted by the protection WDM transmitter.

The optical node may additionally comprise at least one transponder circuit pack comprising at least two service interfaces, wherein the at least two service interfaces transport redundant service data.

In the optical node, the service data from either of the at least two service interfaces may be forwarded to the at least one protection WDM transmitter.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
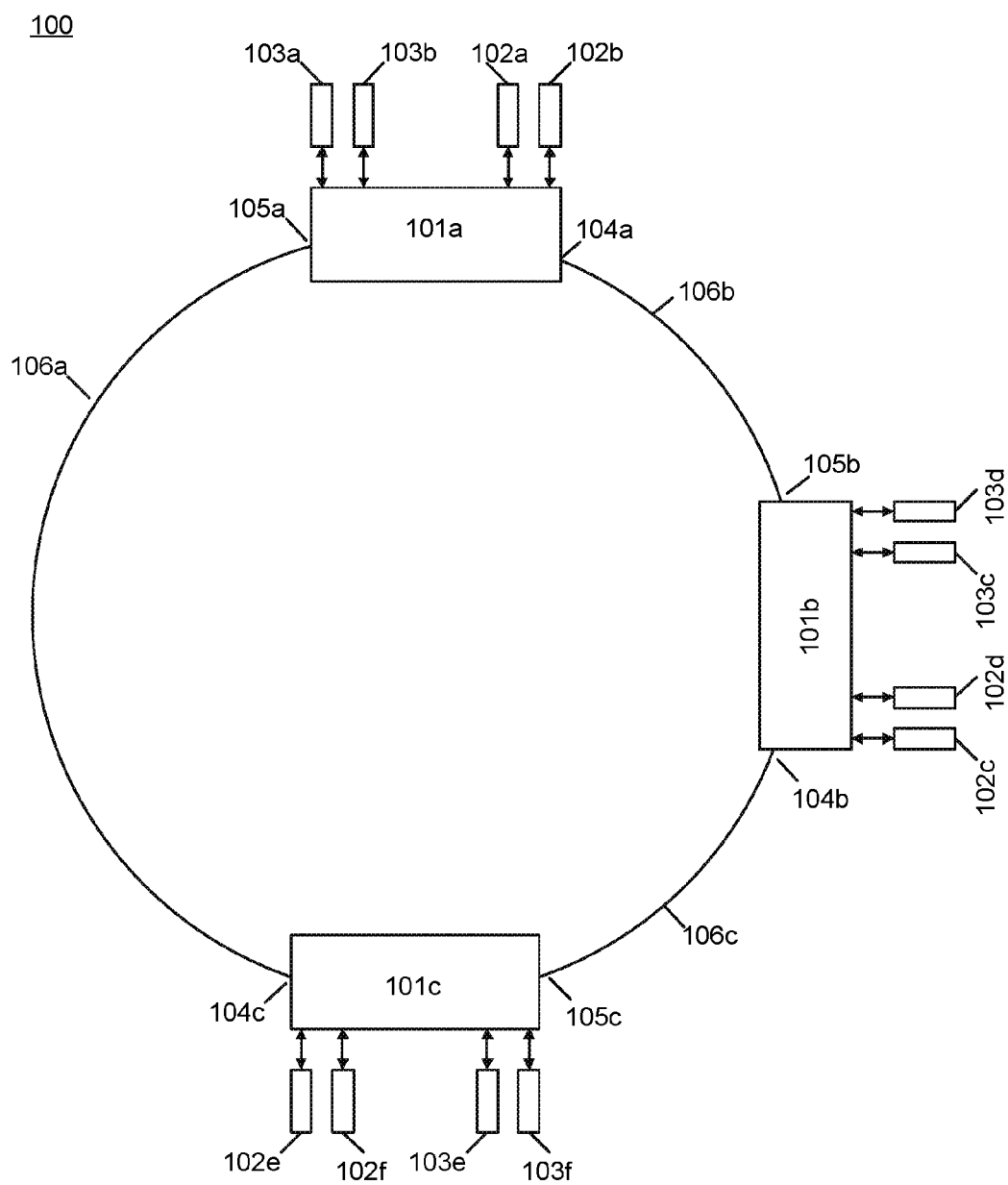
FIG. 1 is an illustration of a Wavelength Division Multiplexed (WDM) network, containing three WDM nodes.

FIG. 1 is an illustration of a Wavelength Division Multiplexed (WDM) network 100, containing three WDM nodes 101a-c, configured in a ring formation. Each node is connected to each of the other nodes with two fibers—one fiber to transport data in the clockwise direction, and one fiber to transport data in the counter clockwise direction. The two fibers connecting two nodes directly together are referred to as a fiber pair. In network 100, there are three fiber pairs 106a, 106b and 106c. Redundant optical data is transmitted around the ring such that one set of data traverses about the ring in the clockwise direction, while the other set of data traverses about the ring in the counter clockwise direction. In this manner, if a fiber pair is cut or damaged between two nodes, data may still be transported between the two nodes. Transponders 102a-f and 103a-f are used to generate WDM wavelengths used to transport data around the network. Two transponder pairs are used to send and receive data between two nodes. For example, transponder 103a in node 101a may send and receive a first data stream to transponder 102e in node 101c, by sending and receiving data over fiber pair 106a. Likewise, transponder 102a in node 101a may send and receive a second data stream to transponder 103e in node 101c, by sending and receiving data over fiber pairs 106b and 106c (wherein node 101b simply "passes through" the data stream from 101a to 101c). For fault tolerance reasons, the second data stream may be identical to the first data stream, so that if either the first or second data stream gets interrupted due to a network fault, then the data is still able to be exchanged between the two nodes. Network faults include fiber cuts, and transponder laser failure. In the network 100, a given transponder is permanently attached to a particular network interface 104a-c, 105a-c. For instance, transponders 103a-b can only transmit and receive to and from network interface 105a. Similarly, transponders 102a-b can only transmit and receive to and from network interface 104a. The transponders are said to be tied to a particular degree of the optical node, wherein an optical degree corresponds to a given network interface. Since each of the nodes 101a-c interfaces to two fiber pairs, each of the nodes 101a-c are considered to be two-degree optical nodes.

By having two transponders sending and receiving redundant data to and from both degrees of nodes 101a-c, if a laser of a given transponder attached to a given node degree fails, then the transponder of the opposite degree is still able to transport the data, and therefore the network is fault tolerant to WDM laser failures.

Figure 2:
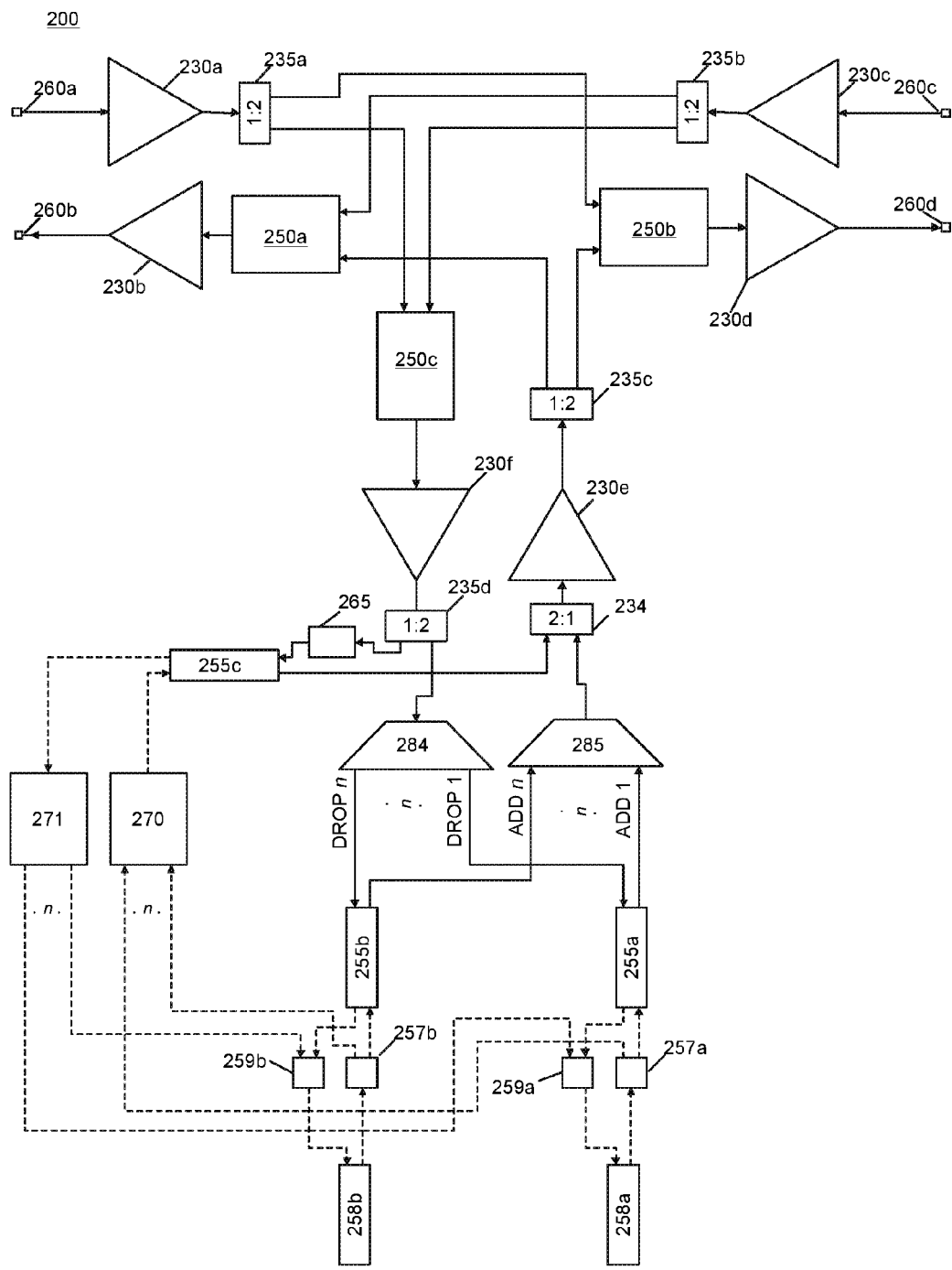
FIG. 2 is an illustration of a two degree node with directionless add/drop ports.

Another method of protecting against fiber cuts is to use directionless add/drop ports within a network node. A directionless add/drop port allows a given transponder to send and receive data to and from any network degree within an optical node. Therefore, in this case, the transponders are not dedicated to a particular degree (direction) of a given optical node. The internals of a two-degree optical node with directionless add/drop ports 200 is depicted in FIG. 2. The node 200 consists of both optical and electrical components. The optical components include: input optical amplifiers 230a and 230c, output optical amplifiers 230b and 230d, add port optical amplifier 230e, drop port optical amplifier 230f, 2-by-1 wavelength selective switches (WSS) 250a-c, 1-to-2 optical couplers 235a-d, 2-to-1 optical coupler 234, optical filter 265, optical multiplexer 285, optical demultiplexer 284, primary WDM transmitter/receivers 255a-b, protection WDM transmitter/receiver 255c, and service transmitter/receivers 258a-b. The electrical components include: n-to-1 electrical multiplexer 270, 1-to-n electrical demultiplexer 271, 1-to-2 electrical demultiplexers 257a-b, and 2-to-1 electrical multiplexers 259a-b. In 200, a solid line between two components indicates that the two components are connected optically, while a dash line between two components indicates that they are connected electrically. It should be noted that optical components 255a-c and 258a-b interface to both optical and electrical components, as these components contain both electrical to optical converters and optical to electrical converters.

In 200, the two network interfaces are 260a-b and 260c-d. In the input direction, a WDM signal enters the system at 260a and 260c, where the signals are first amplified by input optical amplifiers 230a and 230c respectively. Optical couplers 235a and 235b are used to broadcast the amplified optical signals to both the drop WSS 250c, and output WSS devices 250b and 250a respectively. The drop WSS 250c is used to select individual wavelengths from either interface 260a or 260c for the purpose of dropping those selected wavelengths to service transmitter/receivers 258a-b. Therefore, drop WSS 250c facilitates the directionless nature of the optical node in the drop direction. After the dropped wavelengths are selected, they are optionally amplified by optional optical amplifier 230f, and then broadcasted to both optical filer 265 and optical demultiplexer 284. Optical demultiplexer 284 demultiplexes the WDM composite signal into individual wavelengths (DROP 1 to DROP n). Each individual wavelength is then forwarded to a primary WDM transmitter/receiver device 255a-b which converts the wavelengths to their electrical equivalent signals. (A primary WDM transmitter/receiver device is a WDM transmitter/receiver device that is used under non-fault scenarios, whereas a protection WDM transmitter/receiver device is a WDM transmitter/receiver device is used in fault scenarios.) Under non-fault conditions, each electrical signal from each WDM transmitter/receiver device is forwarded to its corresponding service transmitter/receiver 258a-b via electrical multiplexers 259a-b. The service transmitter/receivers receive the electrical signals, convert them to optical signals of a fixed wavelength (usually 850 nm, 1310 nm or 1550 nm), and then transmit the optical signals out their transmit service interfaces (not shown).

In the add direction, incoming optical signals of a fixed wavelength (usually 850 nm, 1310 nm or 1550 nm) are received by the service transmitter/receivers via their optical input interfaces (not shown), and converted to their electrical equivalent signals. Under non-fault conditions, the electrical signals are then forwarded to their corresponding primary WDM transmitter/receiver device 255a-b via electrical demultiplexers 257a-b. Each primary WDM transmitter/receiver device 255a-b converts its received electrical signal to one of n WDM wavelengths. The collection of n individual WDM wavelengths (ADD 1 to ADD n) is then multiplexed into a composite WDM signal via optical multiplexer 285. The WDM signal is forwarded to optional optical amplifier 230e via optical coupler 234, and the WDM signal is optionally amplified and forwarded to optical coupler 235c. Optical coupler 235c broadcasts all the added wavelengths to both WSS 250a and WSS 250b. Each of the two WSS devices 250a and 250b is configured to either block or pass the individual "added" wavelengths of the WDM signal. The two WSS devices 250a and 250b are also used to adjust the optical power levels of the individual wavelengths passing through the devices. Blocked wavelengths are prevented from exiting the corresponding network interface (260b or 260d) of a given WSS. Since all added wavelengths can be directed to either of the two network interfaces of the optical node, the ADD ports of the node are said to be directionless ADD ports. Output WSS device 250a is able to be configured to pass or block individual wavelengths from both the service transmitter/receivers and the network interface 260c. The resulting selection of wavelengths is then amplified by output optical amplifier 230b, and then forwarded out network interface 260b. Similarly, output WSS device 250b is able to be configured to pass or block individual wavelengths from both the service transmitter/receivers and the network interface 260a. The resulting selection of wavelengths is then amplified by output optical amplifier 230d, and then forwarded out network interface 260d.

For cases where there is a fiber cut, wavelengths that normally would exit a particular network interface (260b, for example), are able to be directed to the alternative network interface (260d, for example). In the drop direction, wavelengths that would normally be received from a particular network interface (260a, for example) and dropped, are now able to be received from the alternative network interface (260c, for example) and dropped. This allows a single WDM transmitter/receiver device to be used to send and receive a given wavelength to and from both network interfaces.

The directionless optical circuitry—including: the drop-enabling WSS 250c and the add-enabling optical coupler 235c—provide the ability for the optical node to survive a fiber cut using a single transponder. However, an additional protection mechanism needs to be paired with the directionless optical circuitry in order to protect against laser failure within the single transponder. In order to protect against both fiber cuts and laser failures using a minimal amount of optical and electronic circuitry, directionless optical processing is paired with electrical processing.

In optical node 200, WDM transmitter/receiver device 255c is used to protect against the failure of any one of the up to n primary WDM transmitter/receiver devices 255a-b. Four electrical circuit types are used in order to protect against primary WDM transmitter/receiver device failure: 1-to-2 electrical demultiplexer 257a-b, 2-to-1 electrical multiplexer 259a-b, 1-to-n electrical demultiplexer 271, and n-to-1 electrical multiplexer 270.

When a given primary WDM transmitter/receiver device 255a-b fails (device 255b, for example), the device's associated electrical 1-to-2 demultiplexer (device 257b, for example) is reconfigured in order to direct the electrical signal from its corresponding service transmitter/receiver (device 258b, for example) away from the failed primary WDM transmitter/receiver device (255b, for example), and towards the n-to-1 electrical multiplexer 270. The n-to-1 electrical multiplexer 270 is then configured to forward the signal associated with the failed WDM transmitter/receiver device to protection WDM transmitter/receiver device 255c. The tunable laser within the Protection WDM transmitter/receiver device 255c is then optically tuned to the same frequency as that used by the failed primary WDM transmitter/receiver device. Therefore, protection WDM transmitter/receiver device 255c emits the same wavelength frequency as the failed device normally would emit so that at the receiving end-node no reconfigurations are required. The substituted laser signal from the protection WDM transmitter/receiver device is optically forwarded to optical coupler 234, where it is combined with the wavelengths from the non-failed WDM transmitter/receiver devices emitted from optical multiplexer 285 into a composite WDM signal. No changes are made to the configuration of the optical circuitry following optical coupler 234, other than potentially adjusting the power level of the substituted wavelength using WSS devices 250a-b.

When a given primary WDM transmitter/receiver device 255a-b fails, in addition to the electrical processing done in the "ADD Direction", electrical processing is also performed in the "DROP Direction". In the drop direction, all wavelengths needed to be dropped pass through optical coupler 235d, which broadcasts wavelengths to both demultiplexer 284 and optical filter 265. In the event of a failed primary WDM transmitter/receiver device 255a-b, optical filter 265 is tuned to pass (drop) the wavelength frequency of the failed WDM transmitter/receiver device to the protection WDM transmitter/receiver device 255c. The protection WDM transmitter/receiver device 255c converts the dropped wavelength to its electrical equivalent, and passes the electrical signal to the 1-to-n electrical demultiplexer 271. Electrical demultiplexer 271 is configured to direct the electrical equivalent wavelength to the 2-to-1 multiplexer 259a-b associated with the failed primary WDM transmitter/receiver device. The 2-to-1 multiplexer 259a-b associated with the failed primary WDM transmitter/receiver device is configured to direct the electrical equivalent wavelength from the demultiplexer 271 to the service transmitter/receiver device associated with the failed WDM transmitter/receiver device. Other than configuring the optical filter 265, no other optical reconfiguration is required in the drop direction.

In optical node 200, the optical multiplexer 285 and optical demultiplexer 284 may built to support colored add/drop ports. Each of the n colored add/drop ports support only a particular optical frequency (wavelength). So therefore, add/drop port 1 will only support wavelength frequency 1, and therefore a WDM transmitter/receiver device attached to add/drop port 1 must only generate wavelength frequency 1. The add/drop port—consisting of optical filter 265 and optical couplers 235d and 234—associated with the protection WDM transmitter/receiver device 255c is considered to be a colorless add/drop port. A colorless add/drop port can be used to support any of the n wavelength frequencies associated with the optical node 200, and therefore a WDM transmitter/receiver device attached to colorless add/drop port is allowed to receive and generate any of the n wavelength frequencies.

The optical circuitry 230a-f, 235a-d, 234, 250a-c may be housed on multiple circuit packs, or preferably housed on a single circuit pack. The protection WDM transmitter/receiver device 255c and associated tunable filter 265 may also preferably be housed on the single circuit pack containing optical circuitry 230a-f, 235a-d, 234, 250a-c. The single circuit pack containing optical circuitry 230a-f, 235a-d, 234, 250a-c, 265, and 255c can be considered to be a Reconfigurable Optical Add/Drop Multiplexer (ROADM) circuit pack, and this at least one ROADM circuit pack may optionally be capable of being plugged into an equipment shelf (or chassis) that is capable of housing multiple circuit packs of varying capabilities.

The optical node 200, may additionally comprise of at least one controller circuit pack (not shown) that can be plugged into an equipment shelf that is also housing the at least one ROADM circuit pack. The purpose of the controller circuit pack is to provide general processing power for the multiple circuit packs within the optical node 200.

Additionally, the controller circuit pack may be used to accept and process all external user commands (used to control the optical node).

The protection WDM transmitter/receiver device 255*c* and associated tunable filter 265 may optionally be placed on the controller circuit pack as an alternative to placing them on the ROADM circuit pack. However, if the protection WDM transmitter/receiver device 255*c* and associated tunable filter 265 are placed on the controller circuit pack, the system would require an external optical jumper cable pair to hook up the protection circuitry to the ROADM. This external cable would not be required for the case where the protection WDM transmitter/receiver device 255*c* and associated tunable filter 265 are placed on the ROADM circuit pack, and therein lays one advantage of placing the protection WDM transmitter/receiver device 255*c* and associated tunable filter 265 on the ROADM circuit pack.

In 200, the components consisting of a single primary WDM transmitter/receiver device 255, a single service transmitter/receiver device 258, a single 2-to-1 multiplexer device 259, and a single 1-to-2 demultiplexer device 257, can be placed on a single circuit pack, hereafter referred to as a transponder circuit pack (or simply a transponder). One or more of these transponder circuit packs may be placed into the equipment shelf in which the ROADM and controller circuit packs are placed. Alternatively or additionally, one or more of these transponder circuit packs may be placed in an equipment shelf (chassis) that is separate from the equipment shelf containing the ROADM circuit pack. In either case, external optical jumper cables are used to connect the transponder circuit packs to the optical multiplexer 285 and demultiplexer 284 on the ROADM circuit pack.

In the DROP-direction, in normal (non-fault operation), the transponder receives via its Line interface a single optical wavelength of a given frequency from the demultiplexer device 284 external to the transponder. The transponder then converts the optical wavelength to its equivalent electrical signal (the service data) using the transponder's WDM transmitter and receiver device 255, and then forwards the service data to the transponder's service transmitter/receiver 258 via the transponder's 2-to-1 multiplexer 259. The service transmitter/receiver 258 then converts the electrical signal to a service optical signal, and then forwards the service data to the service interface on the transponder (not shown), where the service interface transports the service data over its attached optical fiber to external equipment.

In the ADD-direction, in normal (non-fault operation), the transponder receives transported service data from an optical fiber attached to its service interface (not shown). The Transponder then converts the optical signal to an electrical equivalent signal via the transponder's service transmitter/receiver 258, after which it is forwarded to the transponder's 1-to-2 demultiplexing device 257. The demultiplexing device forwards the electrical signal to the transponder's WDM transmitter and receiver device 255, where it is converted to an optical signal of a selected (configured) frequency, and then (using the WDM transmitter) the signal is forwarded to the optical multiplexing device external to the transponder via the transponder's Line interface.

When the WDM transmitter/receiver device on the transponder fails, the service data received from its service interface is forwarded to the at least one protection WDM transmitter and receiver device in order to be transmitted by the protection WDM transmitter and receiver device. This is accomplished by reconfiguring the transponder's 1-to-2 demultiplexing device 257, and by reconfiguring multiplexer 270.

In the DROP-direction, when the WDM transmitter/receiver device on the transponder fails, service data received from the protection WDM transmitter and receiver is forwarded to the transponder with the failed WDM transmitter and receiver device in order to be transported out the service interface of the transponder with the failure. This is accomplished by reconfiguring the transponder's 2-to-1 multiplexer device 259, and by reconfiguring demultiplexer 271.

Alternatively, multiple primary WDM transmitter/receiver devices 255, multiple service transmitter/receiver devices 258, multiple 2-to-1 multiplexer devices 259, and multiple 1-to-2 demultiplexer devices 257, can be placed on a single circuit pack. For instance, four of each component type could be placed on a single circuit pack—forming a quad-transponder circuit pack.

A third possible place to house the protection WDM transmitter/receiver device 255*c* and associated tunable filter 265 is on a separate circuit pack. This separate circuit pack could optionally be plugged into a card slot within the one of more shelves of the node 200. For instance, this separate circuit pack containing the protection WDM transmitter/receiver device 255*c* and associated tunable filter 265 could be placed into an equipment shelf slot that normally houses a transponder circuit pack.

The optical multiplexer 285 and optical demultiplexer 284 may be placed on the ROADM circuit pack, or may optionally be placed on a separate circuit pack that can be plugged into the one or more shelves associate with the optical node 200. Assuming that the optical multiplexer 285 and optical demultiplexer 284 are placed on a separate circuit pack, the protection WDM transmitter/receiver device 255*c* (and associated tunable filter 265) may optionally be placed on this multiplexer/demultiplexer circuit pack. If this was done, then ideally optical couplers 235*d* and 234 would also be moved to the multiplexer/demultiplexer circuit pack, as doing so would eliminate one of two external fiber jumper cable pairs connecting the multiplexer/demultiplexer circuit pack to the ROADM circuit pack.

In optical node 200, an alternative to using a separate 1-to-n demultiplexer and a separate n-to-1 multiplexer is to use a single n+1 by n+1 electrical switch, wherein the electrical switch supports n+1 inputs and n+1 outputs. Such a switch would provide the additional ability to loop back signals from the WDM transmitter and receiver devices 255*a-c*. Also, each 2-to-1 multiplexer device 259 and 1-to-2 demultiplexer device 257 could be replaced with a single 3 by 3 electrical switch. Such a switch would additionally allow each of the primary WDM transmitter and receiver devices 255*a-b* to loop back their electrical signal to themselves, and would additionally allow each service transmitter and receiver device to loop back their electrical signal to themselves. Additionally, if k transponders were placed upon a single circuit pack, then a single 3k×3k electrical switch could be used to replace the k number of 3×3 electrical switches. Lastly, if the 1-to-n demultiplexer 271, n-to-1 multiplexer 270, 2-to-1 multiplexer devices 259*a-b*, and 1-to-2 demultiplexer devices 257*a-d* were located on the same circuit pack, and there were a total of n 1-to-2 demultiplexer devices 257*a-b* and n 2-to-1 multiplexer devices 259*a-b*, then devices 270, 271, 257*a-d*, and 259*a-d* could be replaced with a single (2n+1)×(2n+1) electrical switch. The single (2n+1)×(2n+1) electrical switch may be placed on the ROADM circuit pack or the controller circuit pack, or it may reside on a dedicated circuit pack, separate from any other circuit pack.

Assuming the 1-to-n demultiplexer 271 and n-to-1 multiplexer 270 (or equivalent (n+1)×(n+1) electrical switch) were placed on a separate circuit pack from the 2-to-1 multiplexer devices 259a-b and 1-to-2 demultiplexer devices 257a-b (or equivalent 3×3 electrical switches), then the 1-to-n demultiplexer 271 and n-to-1 multiplexer 270 (or equivalent (n+1)×(n+1) electrical switch) may be placed on the ROADM circuit pack, the controller circuit pack, or on a dedicated circuit pack, separate from any other circuit pack.

Additionally, there may be redundant (i.e., two sets of) 1-to-n demultiplexer and n-to-1 multiplexer functions, so that if a 1-to-n demultiplexer or n-to-1 multiplexer function failed, an additional 1-to-n demultiplexer or n-to-1 multiplexer function would be available within the optical node 200. In such a case, if the primary and secondary 1-to-n demultiplexer and n-to-1 multiplexer functions were each located on a separate circuit pack, each transponder would require an additional electrical input and output, so that each transponder could be connected to each of the two switching circuit packs. In order to support the two switching circuit packs, each transponder would require a 3-to-1 multiplexer device and a 1-to-3 demultiplexer device, or a single equivalent 4×4 electrical switch.

Figure 3:
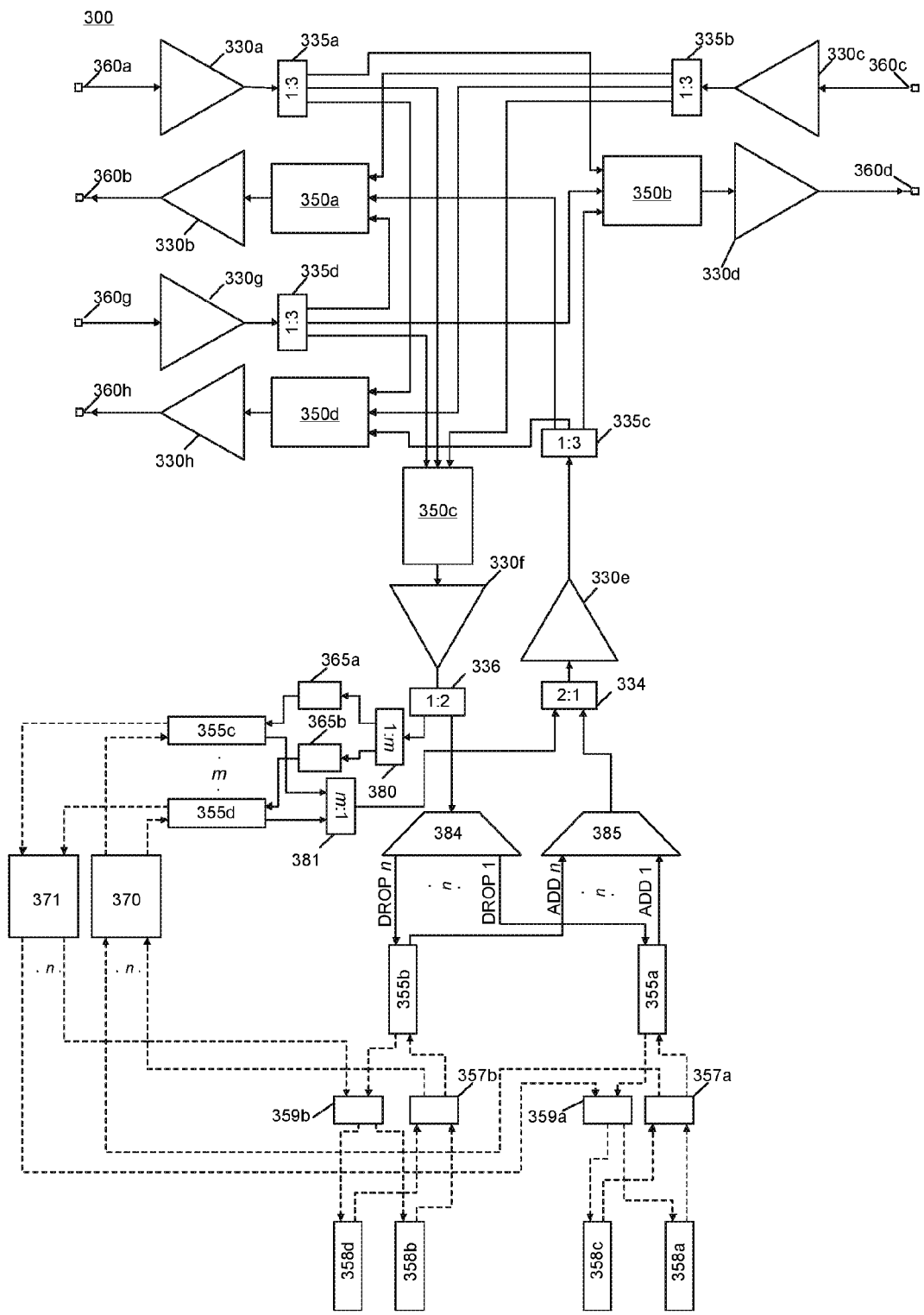
FIG. 3 is an illustration of a three degree node with directionless add/drop ports.

The internals of a three-degree optical node with directionless add/drop ports 300 is depicted in FIG. 3. In addition, optical node 300 illustrates a node with directionless add/drop ports and m-for-n WDM transmitter/receiver protection. The node 300 also includes 1 for 1 protection of the service transmitter/receivers.

In optical node 300, a third optical degree is added to the optical node 200 by adding a fourth WSS 350d, adding a third line input-output amplifier pair 330g-h, modifying all WSS device to be three by one WSS devices (three inputs and one output), modifying all couplers 335a, 335b, 335d attached to input amplifiers 330a, 330c, 330g to be 1 to 3 optical couplers, and modifying the optical coupler 335c driven by ADD-amplifier 330e to be a one to three optical coupler.

In optical node 300, since each output WSS device 350a,b,d of a given degree has access to the wavelengths from all other degrees, any wavelength arriving on any input line interface 360a,c,g can be routed out of any output line interfaces 360b,d,h. Since DROP WSS 350c has access to all input wavelengths, it can forward wavelengths received from any of the three input line interfaces 360a,c,g to the plurality (n) of primary WDM transmitter and receiver devices 355a-b, allowing the drop ports to be directionless ports. In the add-direction, all added wavelengths are multiplexed together using multiplexer 38, and then are forwarded to all three output interface WSS devices 350a,b,d, allowing any added wavelength to be emitted from any of the three output line interfaces 360b,d,h, allowing the add ports to be directionless.

In optical node 300, instead of 1 for n WDM transmitter and receiver protection, m for n WDM transmitter and receiver protection is used. In order to optically support m for n WDM transmitter and receiver protection in the drop direction, coupler 336 is used to broadcast all drop-wavelengths to both optical multiplexer 384 and 1:m optical coupler 380. The optical coupler 380 is then used to broadcast all drop-wavelengths to all m tunable optical filters 365a-b. Each of the m tunable filters can be independently tuned to drop one of n wavelengths to an associated tunable protection WDM transmitter/receiver device 355c-d. The set of m dropped wavelengths are converted to their electrical equivalent signals by WDM transmitter/receiver devices 355c-d, and then forwarded to the m-to-n demultiplexer 371. (The m-to-n demultiplexer could be constructed as a set of n number of m-to-1 multiplexers.) The m-to-n demultiplexer 371 is configured to direct the m dropped wavelengths to the appropriate m multiplexers 359a-b (of n total multiplexers) associated with up to m failed primary WDM transmitter/receiver devices 355a-b. Each multiplexer 359a-b is a dual 2-to-1 multiplexer (which alternatively could be implemented with a 2×2 electrical switch). When protecting for a primary WDM transmitter/receiver device failure, the multiplexer 359a-b is configured to pass the inputted signal from demultiplexer 371 to one of two service transmitter/receiver devices. Using two service transmitter/receiver devices protects against the failure of a single service transmitter/receiver device. Generally, service transmitter/receiver devices are much lower in monetary cost than WDM transmitter/receiver devices, so the cost of doubling the number of service transmitter/receiver devices is minimal. Each of the two service transmitter/receiver devices would generally transport identical optical data to and from external optical equipment.

When not protecting against the failure of a primary WDM transmitter and receiver device, in the drop-direction, multiplexer 359 would be configured to forward data from its associated primary WDM transmitter and receiver device to one of the two (or both) associated service transmitter and receiver devices.

In the add-direction, two service interfaces would generally receive identical optical data from external optical equipment. The service transmitter/receiver devices would convert the optical service data to electrical service data, and then under non-failure conditions, demultiplexer 357 would be configured to forward one of the two service signals to its associated primary WDM transmitter and receiver device. The demultiplexer 357 can be implemented as a dual 2-to-1 multiplexer (which alternatively could be implemented with a 2×2 electrical switch).

In the add-direction, when a primary WDM transmitter and receiver device fails, the demultiplexer 357 is configured to route one of its two service data streams to the n to m multiplexer 370. The n to m multiplexer 370 could be constructed as a set of m number of n-to-1 multiplexers. (It should be noted that the combination of 370 and 371 could be alternatively implemented as a single (n+m)×(n+m) electrical switch.) The n to m multiplexer 370 is configured to route the service data associated with the m number of failed primary WDM transmitters and receivers to the appropriate protection WDM transmitters and receivers within the set of m protection WDM transmitters and receiver devices. Each of the m protection WDM transmitters and receiver devices converts its inputted electrical signal to an equivalent optical signal (of the frequency of the associated failed primary WDM transmitter and receiver device), and forwards the optical signal to the m:1 optical coupler 381, which combines the individual m wavelengths into a single composite WDM signal. The up to m protection optical signals are combined with the signals from the non-failed primary WDM transmitter/receiver devices from multiplexer 385 via optical coupler 334. The resulting optical signal contains service data from all (up to) n sets of service interfaces, and is then distributed to all three output WSS devices 350a,b,d via optical coupler 335c.

In 300, the components consisting of a single primary WDM transmitter/receiver device 355, two service transmitter/receiver devices 358a-d single 2-to-2 multiplexer device 359, and a single 2-to-2 demultiplexer device 357, can be placed on a single transponder circuit pack. The transponder circuit pack would contain two service interfaces used to transport service data. When one of the two service transmitter/receiver devices fails, or if one of the fibers associated with the two service interfaces fail, the transponder is able to forward the data of the non-failed service interface to the primary WDM transmitter and receiver on the transponder. In the case of a failed primary WDM transmitter and receiver, service data from either of the two service interfaces may be forwarded to and received from the at least one protection WDM transmitter and receiver device 355c-d.

In optical nodes 200 and 300, the electronic circuitry used for protection purposes may be implemented as a plurality of electronic multiplexers and demultiplexers, or as a plurality of electronic switches, or as a plurality of electronic multiplexers and demultiplexers and electronic switches. In one possible implementation a single electronic switch is used to implement the combination 270/271 function (or 370/371 function), and electronic multiplexers and demultiplexers are used to implement the 257/259 functions (or 357/359 functions).

Key to any implementation is keeping the protection transponders on either the ROADM circuit pack or multiplexer/demultiplexer circuit pack, in order to limit the number of external optical jumper cables. As can be seen from optical node 300, there is a tight coupling of directionless optical components, protection optical components, and electrical routing components required to efficiently construct a multi-degree optical node with the directionless add/drop ports with m for n WDM transmitter/receiver protection.

Figure 4A:
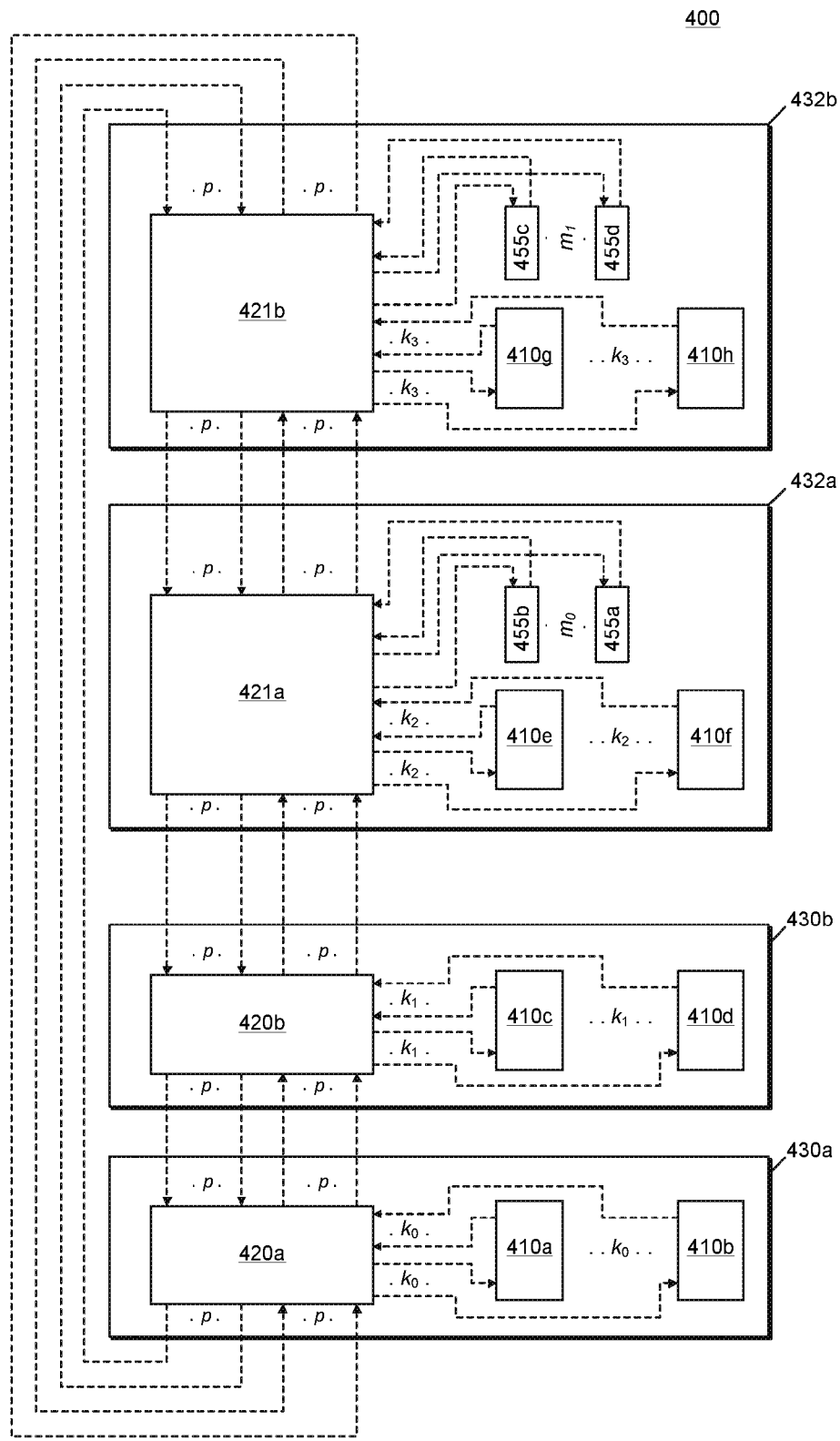
FIG. 4A is an illustration of a WDM node spread over four shelves.

In general, the optical node may comprise of at least a first equipment shelf and a second equipment shelf. For this case, the at least one protection WDM transmitter and receiver may reside in the first equipment shelf, and the at least one primary WDM transmitter and receiver being protected may reside in the second equipment shelf Additionally, there may be at least a first and second equipment shelf—each containing at least one protection WDM transmitter and receiver—and at least a third and fourth equipment shelf each containing a plurality of primary WDM transmitters and receivers. For the latter case, the first and second equipment shelves may additionally contain primary WDM transmitters and receivers. For this case, any of the primary WDM transmitters and receivers on any of the four equipment shelves may be preferably protected by any of the protection WDM transmitters and receivers on the first and second equipment shelves. This configuration is illustrated in FIG. 4A via optical node 400.

Optical node 400 may be constructed with a first equipment shelf 432a containing both transponders 410e-f and protection WDM transmitter and receiver devices 455a-b, a second equipment shelf 432b containing both transponders 410g-h and protection WDM transmitter and receiver devices 455c-d, a third equipment shelf 430a containing transponders 410a-b, and a fourth equipment shelf 430b containing transponders 410c-d. Equipment shelves 432a-b additionally contain ROADM components (not shown), such as previously discussed with reference to optical nodes 200 and 300. For simplicity, the optical node 400 depicted in FIG. 4A primarily illustrates the electrical protection paths (indicated by the dashed lines connecting components).

In optical node 400, electrical components 420a-b and 421a-b contain the electronic routing circuitry used to route protected data streams to and from the protection WDM transmitters and receivers' 455a-b/455c-d and all transponders 410a-h across all four equipment shelves 430a-b and 432a-b.

Figure 4B:
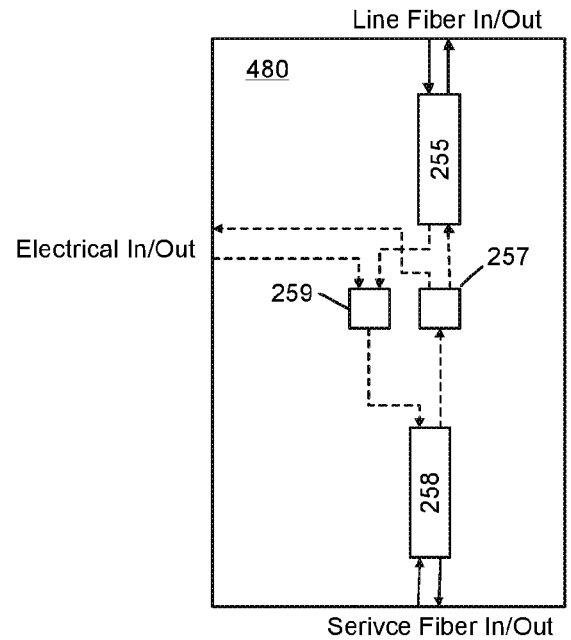
FIG. 4B is an illustration of a WDM transponder containing a single service interface.
Figure 4C:
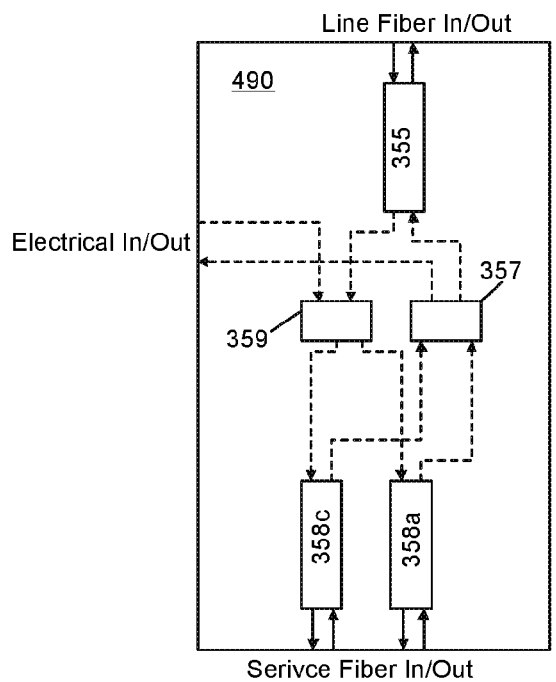
FIG. 4C is an illustration of a WDM transponder containing two service interfaces.

FIG. 4B and FIG. 4C show two possible transponder circuit pack types 480 and 490 that could be used for the transponder s 410a-h in optical node 400. Transponders 480 and 490 are the two transponder circuit pack types discussed previously with regard to optical nodes 200 and 300 respectively. Optical transponder circuit pack 480 contains a primary WDM transmitter and receiver 255, a 2-to-1 electronic multiplexer device 259, a 1-to-2 electronic demultiplexing device 257, and a single service transmitter and receiver 258. In addition to its optical line interface and single service fiber interface, the optical transponder 480 contains an electrical In/Out interface—used to interface to electrical routing devices 420a-b and 421a-b. Optical transponder circuit pack 490 contains a primary WDM transmitter and receiver 355, a 2-to-2 electronic multiplexer device 359, a 2-to-2 electronic demultiplexing device 357, and two service transmitter and receiver devices 358a,c. In addition to its optical line interface and two service fiber interfaces, the optical transponder 490 contains an electrical In/Out interface—used to interface to electrical routing devices 420a-b and 421a-b.

Figure 5:
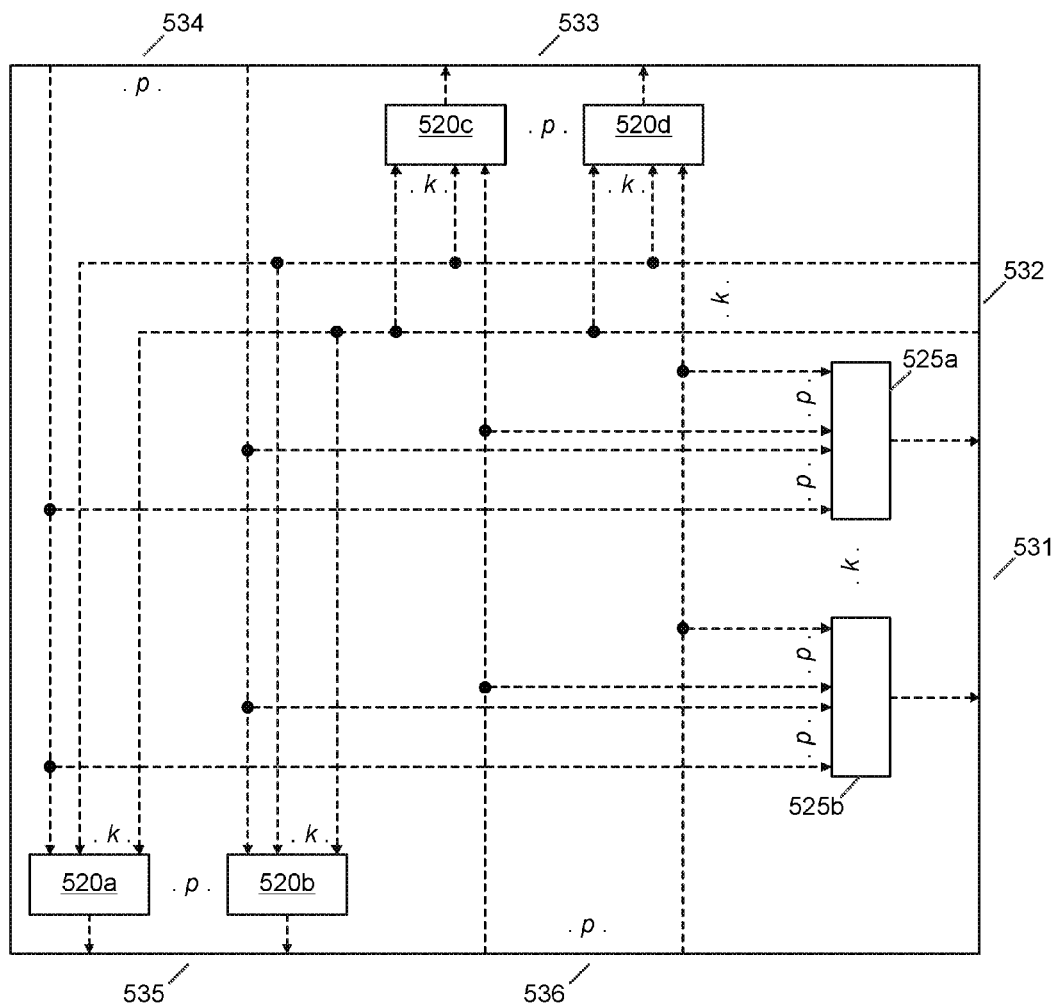
FIG. 5 is a more detailed drawing of the electrical processing within 420.

Details of the electronic routing device 420 are illustrated in FIG. 5. The electronic routing device 420 contains six electrical interfaces: a north output protection path interface 533 containing p number of electrical signals, a north input protection path interface 534 containing p number of electrical signals, a south output protection path interface 535 containing p number of electrical signals, a south input protection path interface 536 containing p number of electrical signals, an east output protection path 531 containing k number of electrical signals, and an east input protection path 532 containing k number of electrical signals. East protection paths 531 532 are used to send and receive protection data to and from the transponders of a given shelf 430a-b, as illustrated in FIG. 4A, and input and output North and South protection paths are used to send protected signals between equipment shelves in a redundant manner. In one example embodiment, the north and south protected paths may be implemented with optical signals in place of electrical signals. Then for this case, 2p number of fibers may be bundled into a single parallel fiber ribbon cable that is terminated in an MTP type optical connector. In the interconnection scheme shown in optical node 400, each equipment shelf is able to access the 2p number of fibers via two different interfaces. Therefore, if one parallel fiber ribbon cable fails or is removed, a given shelf can send and receive protection data to and from its other parallel fiber interface.

In 400, it is assumed that the total number of protection WDM transmitters and receivers p is equal to the number of protection WDM transmitters and receivers $m_0$ contained in shelf 432a plus the number of protection WDM transmitters and receivers $m_1$ contained in shelf 432b, or in other words $p=m_0+m_1$. (For simplicity, it will be assumed that $m_0=m_1$, but in alternative embodiments this does not have to be the case.) Therefore, each of the k number of transponders in a given shelf can access any of the p number of protection WDM transmitters and receivers in the optical node 400 by configuring the multiplexer and demultiplexer on its own circuit pack, and by appropriately configuring the k number of 2p-to-1 multiplexers 525a-b, and the 2p number of k+1-to-1 multiplexers 520a-d within router 420. In order to retrieve protection data from router 420 for a given transponder, the 2p-to-1 multiplexer 525*a-b* associated with the given transponder is configured to select from among the 2p number of protected data streams. In order to insert protection data through router 420 from a given transponder to a particular protection data stream, the k+1-to-1 multiplexer associated with the particular protection data stream is configured to select protection data from the given transponder (from the group of k transponders within its equipment shelf). This is done on both the group of p north multiplexers 520*c-d* and the group of p south multiplexers 520*a-b*, for parallel fiber protection purposes.

Figure 6:
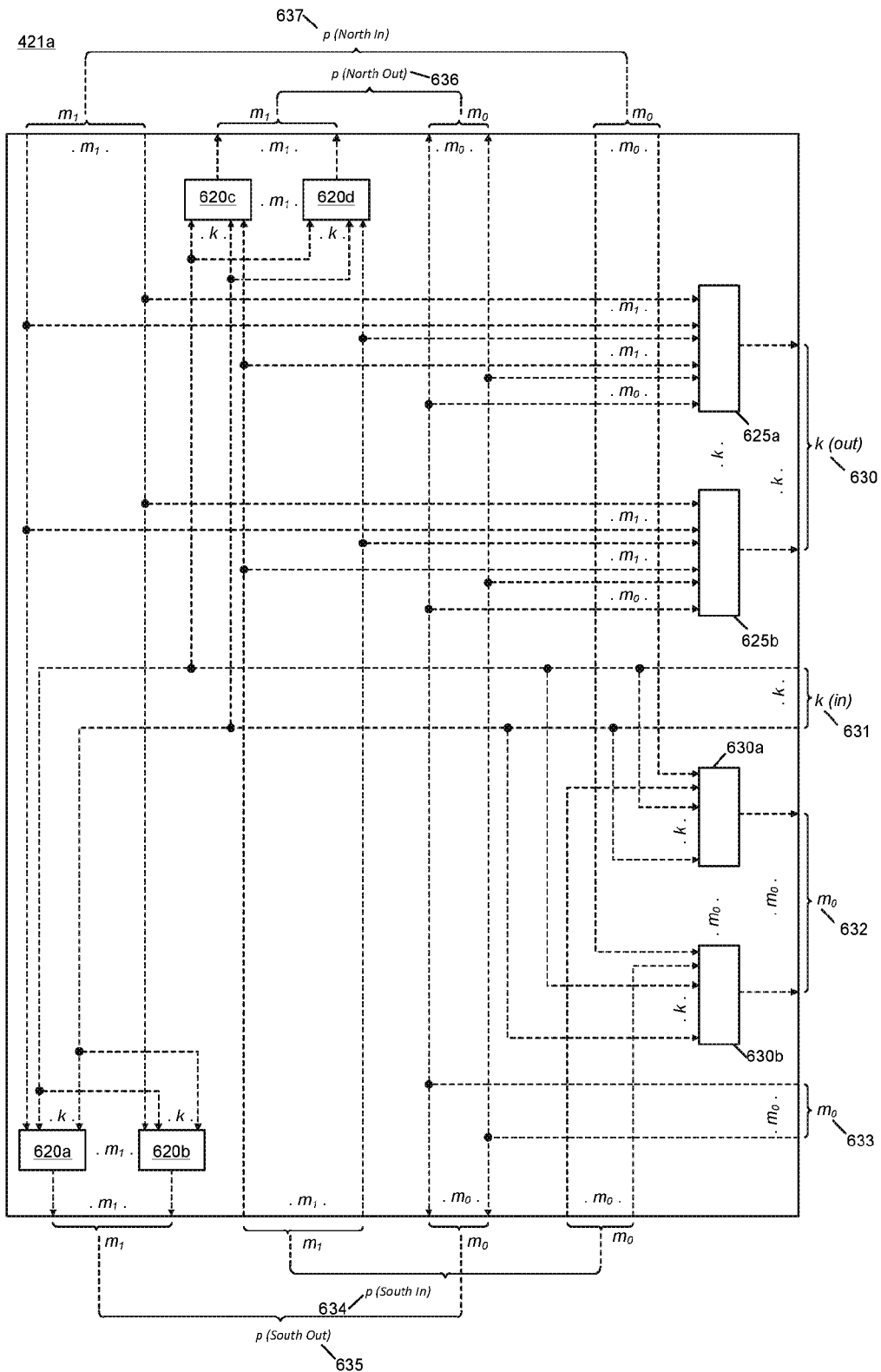
FIG. 6 is a more detailed drawing of the electrical processing within 421.

Details of the electronic routing device 421 are illustrated in FIG. 6, wherein the details of 421*a* are illustrated (the details for 421*b* are similar). The electronic routing device 421*a* contains eight electrical interfaces: a north output protection path interface 636 containing p number of signals, a north input protection path interface 637 containing p number of signals, a south output protection path interface 635 containing p number of signals, a south input protection path interface 634 containing p number of signals, an east output protection path 630 (used to connect to transponders) containing k number of electrical signals, an east input protection path 631 (used to connect to transponders) containing k number of electrical signals, an east output protection path 632 (used to connect to protection WDM transmitters and receivers) containing m number of electrical signals, and an east input protection path 633 (used to connect to protection WDM transmitters and receivers) containing m number of electrical signals. East protection paths 630 631 are used to send and receive protection data to and from the transponders of the shelf (432*a*, in this case), as illustrated in FIG. 4A, and input and output North and South protection paths are used to send protected signals between equipment shelves in a redundant manner. For example, the north and south protected paths may be implemented with optical signals in place of electrical signals. Then for this case, 2p number of fibers may be bundled into a single parallel fiber ribbon cable that is terminated in an MTP type optical connector. In the interconnection scheme shown in optical node 400, each equipment shelf is able to access the 2p number of fibers via two different interfaces. Therefore, if one parallel fiber ribbon cable fails or is removed, a given shelf can send and receive protection data to and from its other parallel fiber interface.

In 421*a*, East protection paths 632 and 633 are used to send protection data to and from the group of m protection WDM transmitters and receivers.

Each of the k number of transponders in a given shelf 432*a-b* can access any of the p number of protection WDM transmitters and receivers in the node by configuring the multiplexer and demultiplexer on its own circuit pack, and by appropriately configuring the k number of 3m-to-1 multiplexers 625*a-b*, and the 2m number of k+1-to-1 multiplexers 620*a-d* within router 421*a*, as well as the m number of k+2-to-1 multiplexers 630*a-b* within router 421*a*. In order to retrieve protection data from router 421*a* for a given transponder, the 3m-to-1 multiplexer 625*a-b* associated with the given transponder is configured to select from among the 3m number of protected data streams. In order to insert protection data through router 421*a* from a given transponder to a particular protection data stream, the k+1-to-1 multiplexer 620*a-d* associated with the particular protection data stream is configured to select protection data from the given transponder (from the group of k transponders within its equipment shelf). This is done on both the group of m north multiplexers 620*c-d* and the group of m south multiplexers 620*a-b*, for parallel fiber protection purposes.

It should be noted that each of the m signals associated with the protection WDM transmitter and receiver devices within a given shelf 432*a-b* is dedicated to a particular WDM transmitter and receiver device on that shelf. Therefore, when a shelf 430*a-b* wishes to use a particular protection WDM transmitter and receiver on one of the two shelves 432*a-b*, it must use the particular signal (within the group of p signals) that correspond to the protection WDM transmitter and receiver device on the shelves 432*a* and 432*b*. This is why in 421*a* each multiplexer 630*a-b* uses only one signal from the p (North In) bus 637, and only one signal from the p (South In) bus 634. In addition, since all k transponders in shelf 432*a* require access to all m protection WDM transmitters and receivers within shelf 432*a*, each of the m multiplexers 630*a-b* requires a signal from each of the k local transponders.

In FIG. 6, each of the p input and output busses are split into two halves; an $m_0$ half and an $m_1$ half, wherein $p=m_0+m_1$. This is done because the two halves of the p bus are processed differently with router 421. The local half of the p bus is designated as $m_0$, while the protection signals associated with the protection WDM transmitters and receivers of the opposite shelf are designated as $m_1$.

In FIG. 6, the WDM signals from protection WDM transmitters and receivers within the shelf (local) are received by the router 421*a* at interface 633. The m signals (one from each of the m protection WDM transmitter and receiver devices) are forwarded both to the North 636 and South 635 p busses (so that the signals can be directed to the other three shelves of the node), as well as to the k number of multiplexers 625*a-b* (so that the k local transponders also have access to the signals from the protection WDM transmitter and receiver devices).

Within 421*a*, each of the k transponders local to the shelf requires access to all p protection WDM transmitters in the optical node 400. The local transponders get access to the protection data from the other shelf (421*b*) via the two $m_1$ busses within the p (North In) bus 637 and the p (South In) bus 634. The local transponders get access to the protection data from the local shelf (432*a*) via the m input signals from interface 633. These three sets of m signals are inputted to each of the k multiplexers 625*a-b*, as shown.

If a local transponder (local to shelf 432*a*) requires the use of a protection WDM transmitter and receiver on the other shelf (432*b*) containing protection WDM transmitters and receivers, it does so by inserting its service data into the appropriate $m_1$ bus exiting both North and South within 421*a*. It accomplishes this insertion by configuring one of the m multiplexers 620*a-b* and one of the m multiplexers 620*c-d* so that the inserted data is placed on both the p (South Out) bus 635 and the p (North out bus) 636. Any of the $m_1$ protection signals that are not used by local transponders, simply get passed through multiplexers 620*a-d*.

Within electronic routers 420 and 421, the electronic circuitry could be implemented with a series of electronic multiplexers and demultiplexers (as shown), or alternatively as a collection of j×j electronic switches, or alternatively as a collection of electronic multiplexers and demultiplexers and j×j electronic switches.

Although not shown in optical nodes 200 and 300, colorless add/drop ports could be used in place of colored add/drop ports for the primary WDM transmitters and receivers 255*a-b* and 355*a-b*. This could be done by replacing demultiplexers 284 and 384 with a 1:x coupler followed by x number of tunable filters, and by replacing multiplexer 285 and 385 with an x:1 optical coupler (wherein x could be any integer value between 1 and n).

What is claimed is:

1. An optical node comprising:
   an n number of primary Wavelength Division Multiplexed (WDM) transmitters used to generate an n number of wavelengths;
   an m number of protection WDM transmitters used to generate an m number of wavelengths;
   an optical coupler used to combine the n number of wavelengths and the m number of wavelengths;
   network interfaces;
   wavelength selecting devices used to pass and block wavelengths from the optical coupler to all network interfaces of the optical node;
   a plurality of service transmitters;
   a first electrical switch; and
   a plurality of second electrical switches residing between the plurality of service transmitters and the n number of primary WDM transmitters,
   wherein the plurality of second electrical switches are used to switch electrical signals from the plurality of service transmitters to the first electrical switch and to the n number of primary WDM transmitters, and wherein the first electrical switch is used to switch electrical signals from the plurality of second electrical switches to the m number of protection WDM transmitters.

2. The optical node of claim 1, wherein n is at least 2, and wherein m is at least 1.

3. The optical node of claim 1, wherein any of the m number of protection WDM transmitters are operable to transmit in place of any of the n number of primary WDM transmitters using the same wavelength frequencies as used by the n number of primary WDM transmitters.

4. An optical node comprising:
   a first network interface;
   a second network interface;
   an n number of primary Wavelength Division Multiplexed (WDM) transmitters used to generate an n number of wavelengths having an n number of wavelength frequencies, wherein n is at least 2;
   an m number of protection WDM transmitters used to generate an m number of wavelengths having any of the n number of wavelength frequencies, wherein m is at least 1;
   an n number of primary WDM receivers;
   an m number of protection WDM receivers;
   a first wavelength selecting device used to select individual wavelengths from the n number of wavelengths and from the m number of wavelengths and from the first network interface for the second network interface;
   a second wavelength selecting device used to select individual wavelengths from the n number of wavelengths and from the m number of wavelengths and from the second network interface for the first network interface;
   a third wavelength selecting device, used to select individual wavelengths from the first network interface and from the second network interface for the n number of primary WDM receivers and for the m number of protection WDM receivers;
   a plurality of service transmitters;
   a plurality of service receivers;
   a first electrical switch; and
   a plurality of second electrical switches residing between the plurality of service transmitters and the n number of primary WDM transmitters,
   wherein the plurality of second electrical switches are used to switch electrical signals from the plurality of service transmitters to the first electrical switch and to the n number of primary WDM transmitters, and wherein the first electrical switch is used to switch electrical signals from the plurality of second electrical switches to the m number of protection WDM transmitters, and wherein the first electrical switch is used to switch electrical signals from the m number of protection WDM receivers to the plurality of second electrical switches, and wherein the plurality of second electrical switches are used to connect up to an m number of electrical signals from the first electrical switch to the plurality of service receivers while disconnecting up to an m number of electrical signals from the n number of primary WDM receivers to the plurality of service receivers.

5. The optical node of claim 4, wherein m is at least 2.

6. An optical node comprising:
   an n number of primary Wavelength Division Multiplexed (WDM) receivers used to receive a first plurality of wavelengths;
   an m number of protection WDM receivers used to receive a second plurality of wavelengths;
   network interfaces;
   a wavelength selecting device, used to select the first plurality of wavelengths from any of the network interfaces, and used to select the second plurality of wavelengths from any of the network interfaces;
   a plurality of service receivers;
   a first electrical switch; and
   a plurality of second electrical switches residing between the plurality of service receivers and the n number of primary WDM receivers,
   wherein the first electrical switch is used to switch electrical signals from the m number of protection WDM receivers to the plurality of second electrical switches, and wherein the plurality of second electrical switches are used to connect up to an m number of electrical signals from the first electrical switch to the plurality of service receivers while disconnecting up to an m number of electrical signals from the n number of primary WDM receivers to the plurality of service receivers.

7. The optical node of claim 6, wherein n is at least 2, and wherein m is at least 2.

8. The optical node of claim 6, further comprising:
   a Reconfigurable Add Drop Multiplexer (ROADM) circuit pack comprising: the network interfaces, at least one of the m number of protection WDM receivers, and the wavelength selecting device; and
   a plurality of transponder circuit packs, each comprising: one of the n number of primary WDM receivers, at least one of the plurality of service receivers, and at least one of the plurality of second electrical switches, wherein the at least one of the plurality of second electrical switches resides between the at least one of the plurality of service receivers and the primary WDM receiver.

9. The optical node of claim 8, wherein at least one of the plurality of transponder circuit packs further comprises a second one of the plurality of service receivers, and wherein the at least one of the plurality of second electrical switches on the at least one of the plurality of transponder circuit packs is used to switch an electrical signal from one of the n number of primary WDM receivers and from one of the m number of protection WDM receivers to the at least one of the plurality of service receivers and to the second one of the plurality of service receivers.

10. The optical node of claim 9, wherein the second one of the plurality of service receivers protects against a failure of the at least one of the plurality of service receivers.

11. The optical node of claim 6, further comprising:
an n number of primary WDM transmitters used to generate an n number of wavelengths;
an m number of protection WDM transmitters used to generate an m number of wavelengths; and
a plurality of service transmitters,
wherein the plurality of second electrical switches are used to switch electrical signals from the plurality of service transmitters to the first electrical switch and to the n number of primary WDM transmitters, and wherein the first electrical switch is used to switch electrical signals from the plurality of second electrical switches to the m number of protection WDM transmitters.

12. An optical node comprising:
an n number of primary Wavelength Division Multiplexed (WDM) transmitters used to generate an n number of wavelengths, wherein n is at least 2;
an m number of protection WDM transmitters used to generate an m number of wavelengths, wherein m is at least 2;
an optical coupler used to combine the n number of wavelengths and the m number of wavelengths;
a plurality of service transmitters;
a first electrical switch having n inputs and m outputs; and
a plurality of second electrical switches residing between the plurality of service transmitters and the n number of primary WDM transmitters,
wherein the plurality of second electrical switches are used to switch electrical signals from the plurality of service transmitters to the first electrical switch and to the n number of primary WDM transmitters, and wherein the first electrical switch is used to switch electrical signals from the plurality of second electrical switches to the m number of protection WDM transmitters.

13. An optical node comprising:
an n number of primary Wavelength Division Multiplexed (WDM) transmitters used to generate an n number of wavelengths;
an m number of protection WDM transmitters used to generate an m number of wavelengths;
an optical coupler used to combine the n number of wavelengths and the m number of wavelengths;
a second optical coupler used to combine the m number of wavelengths;
a plurality of service transmitters;
a first electrical switch; and
a plurality of second electrical switches residing between the plurality of service transmitters and the n number of primary WDM transmitters,
wherein the plurality of second electrical switches are used to switch electrical signals from the plurality of service transmitters to the first electrical switch and to the n number of primary WDM transmitters, and wherein the first electrical switch is used to switch electrical signals from the plurality of second electrical switches to the m number of protection WDM transmitters.

14. An optical node comprising:
an n number of primary Wavelength Division Multiplexed (WDM) receivers used to receive a first plurality of wavelengths;
an m number of protection WDM receivers used to receive a second plurality of wavelengths;
a plurality of service receivers;
a first electrical switch; and
a plurality of second electrical switches residing between the plurality of service receivers and the n number of primary WDM receivers,
wherein the first electrical switch is used to switch electrical signals from the m number of protection WDM receivers to the plurality of second electrical switches, and wherein the plurality of second electrical switches are used to connect up to an m number of electrical signals from the first electrical switch to the plurality of service receivers while disconnecting up to an m number of electrical signals from the n number of primary WDM receivers to the plurality of service receivers, and wherein the first plurality of wavelengths comprises of an n number of wavelength frequencies, and wherein the second plurality of wavelengths comprises of any of the n number of wavelength frequencies.

15. An optical node comprising:
an n number of primary Wavelength Division Multiplexed (WDM) receivers used to receive a first plurality of wavelengths;
an m number of protection WDM receivers used to receive a second plurality of wavelengths;
an m number of tunable filters, used to select individual wavelengths for the m number of protection WDM receivers;
a plurality of service receivers;
a first electrical switch; and
a plurality of second electrical switches residing between the plurality of service receivers and the n number of primary WDM receivers,
wherein the first electrical switch is used to switch electrical signals from the m number of protection WDM receivers to the plurality of second electrical switches, and wherein the plurality of second electrical switches are used to connect up to an m number of electrical signals from the first electrical switch to the plurality of service receivers while disconnecting up to an m number of electrical signals from the n number of primary WDM receivers to the plurality of service receivers.

* * * * *